United States Patent
Farooq et al.

(10) Patent No.: US 9,783,153 B2
(45) Date of Patent: Oct. 10, 2017

(54) BUMPER ASSEMBLY INCLUDING LOWER LEG STIFFENER

(71) Applicant: Ford Global Technologies, LLC, Dearborn, MI (US)

(72) Inventors: Iskander Farooq, Novi, MI (US); James Chih Cheng, Troy, MI (US); Srinivasan Sundararajan, Ann Arbor, MI (US); Mohammed Omar Faruque, Ann Arbor, MI (US); Dean M. Jaradi, Macomb, MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/938,289

(22) Filed: Nov. 11, 2015

(65) Prior Publication Data
US 2017/0129448 A1    May 11, 2017

(51) Int. Cl.
*B60R 21/00* (2006.01)
*B60R 21/34* (2011.01)
*B60R 19/02* (2006.01)

(52) U.S. Cl.
CPC ............ *B60R 21/34* (2013.01); *B60R 19/023* (2013.01)

(58) Field of Classification Search
CPC .............................. B60R 21/34; B60R 12/023
USPC ............................ 296/180.1, 180.5; 293/118
See application file for complete search history.

(56) References Cited

U.S. PATENT DOCUMENTS

| 4,264,093 | A | | 4/1981 | Long | |
|---|---|---|---|---|---|
| 4,582,351 | A | * | 4/1986 | Edwards | ................ B60R 19/56 293/102 |
| 6,089,628 | A | | 7/2000 | Schuster | |
| 6,726,260 | B1 | | 4/2004 | Wang et al. | |
| 7,192,079 | B2 | | 3/2007 | Schramm et al. | |
| 8,317,239 | B2 | * | 11/2012 | Martin | ................... B60R 19/38 293/102 |
| 8,702,152 | B1 | * | 4/2014 | Platto | .................. B62D 35/005 296/180.1 |
| 8,950,800 | B1 | | 2/2015 | Farooq et al. | |
| 9,102,290 | B1 | | 8/2015 | Cuddihy et al. | |

(Continued)

FOREIGN PATENT DOCUMENTS

| CN | 104960491 | 10/2015 |
|---|---|---|
| CN | 105253084 | 1/2016 |

(Continued)

OTHER PUBLICATIONS

"Current Trends in Bumper Design for Pedestrian Impact", Peter J. Schuster, California Polytechnic State University, 2006-1-0464, © 2006 SAE International, 16 pages.

(Continued)

*Primary Examiner* — Joseph D Pape
(74) *Attorney, Agent, or Firm* — Frank MacKenzie; Bejin Bieneman PLC

(57) ABSTRACT

A bumper assembly includes a bumper beam, an actuator, and a lower stiffener. The actuator includes a base mounted to the bumper beam, and a rod moveably engaged with the base along a vertical axis. The lower stiffener is fixed to the rod. Depending on pre-determined vehicle speeds, the lower stiffener moves from a deployed position to a retracted position based on pedestrian leg impact considerations and to reduce the likelihood of lower stiffener damage.

20 Claims, 8 Drawing Sheets

(56) References Cited

U.S. PATENT DOCUMENTS

| | | | |
|---|---|---|---|
| 2007/0125589 A1 | 6/2007 | Murphy | |
| 2008/0157547 A1 | 7/2008 | Baumann et al. | |
| 2013/0341110 A1* | 12/2013 | Butlin, Jr. ............ | B62D 35/005 |
| | | | 180/68.1 |
| 2014/0015277 A1 | 1/2014 | Beedle et al. | |
| 2015/0151700 A1 | 6/2015 | Revankar et al. | |

FOREIGN PATENT DOCUMENTS

| | | |
|---|---|---|
| DE | 102004059747 | 6/2006 |
| JP | 2000108818 | 4/2000 |
| JP | 2004074972 | 3/2004 |
| JP | 2014104781 | 6/2014 |

OTHER PUBLICATIONS

"Toward Designing Pedestrian-Friendly Veicles", Hu et al., University of Michigan, Transportation Research Institute, UMTRI-2012-19, Jul. 2012, 53 pages.
GB Search Report, Appl. No. GB1619003.5, May 11, 2017, 4 pages.

\* cited by examiner

US 9,783,153 B2

BUMPER ASSEMBLY INCLUDING LOWER LEG STIFFENER

BACKGROUND

The Global Technology Regulation (GTR) and the New Car Assessment Program (NCAP) in Europe and Japan specify the leg injury criteria for pedestrian protection. In particular, these regulations are aimed at preventing the legs of a pedestrian from sliding under a vehicle bumper during a vehicle-pedestrian impact.

Light duty trucks and sport utility vehicles (SUVs), for example, may have a relatively high bumper height that may allow the lower leg to bend and slide under the bumper. Specifically, light duty trucks have relatively higher bumper heights to provide ground clearance to clear speed bumps, curbs, parking blocks, inclined driveway ramps, hills, rough roads, etc. at lower speeds. Some Sports Utility Vehicles (SUVs) and light duty trucks also have off-road capabilities at low speed that preclude having any components below the bumper. As such, there is an opportunity to design a bumper assembly for pedestrian leg impact energy management while addressing ground clearance requirements.

DETAILED DESCRIPTION

Figure 1:
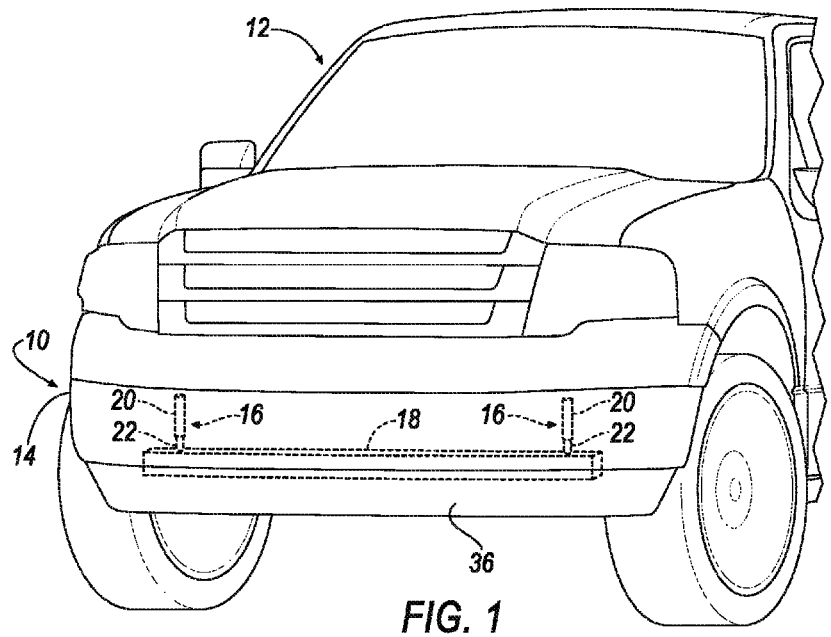
FIG. 1 is a perspective view of a portion of a vehicle including a first embodiment of a bumper assembly including a lower stiffener in a retracted position shown in hidden lines.

With reference to the Figures, wherein like numerals indicate like parts throughout the several views, a bumper assembly 10, 100, 200 for a vehicle 12 includes a bumper beam 14, an actuator 16, and a lower stiffener 18. The actuator 16 includes a base 20 mounted to the bumper beam 14, and a rod 22 moveably engaged with the base 20 along a vertical axis A. The lower stiffener 18 is fixed to the rod 22.

Figure 2:
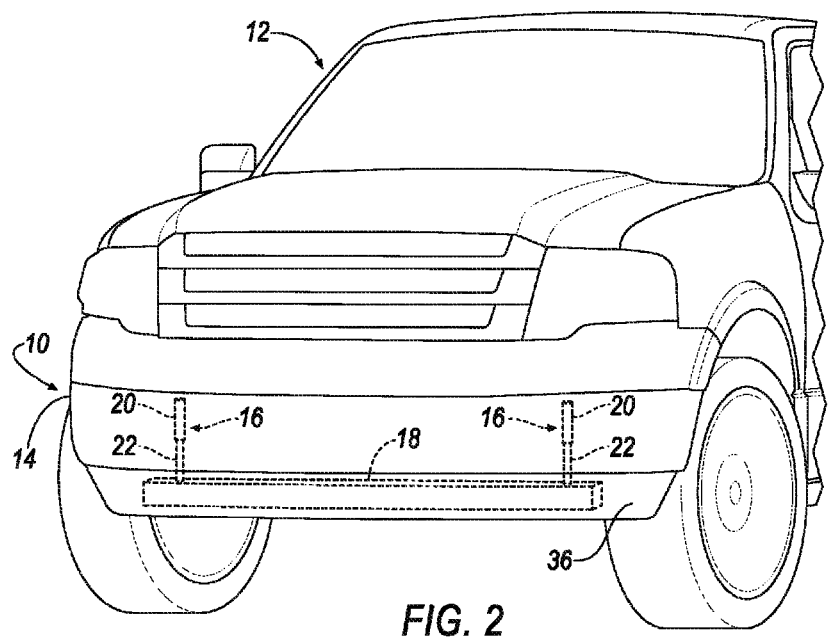
FIG. 2 is the perspective view of FIG. 1 with the lower stiffener in a deployed position.
Figure 3:
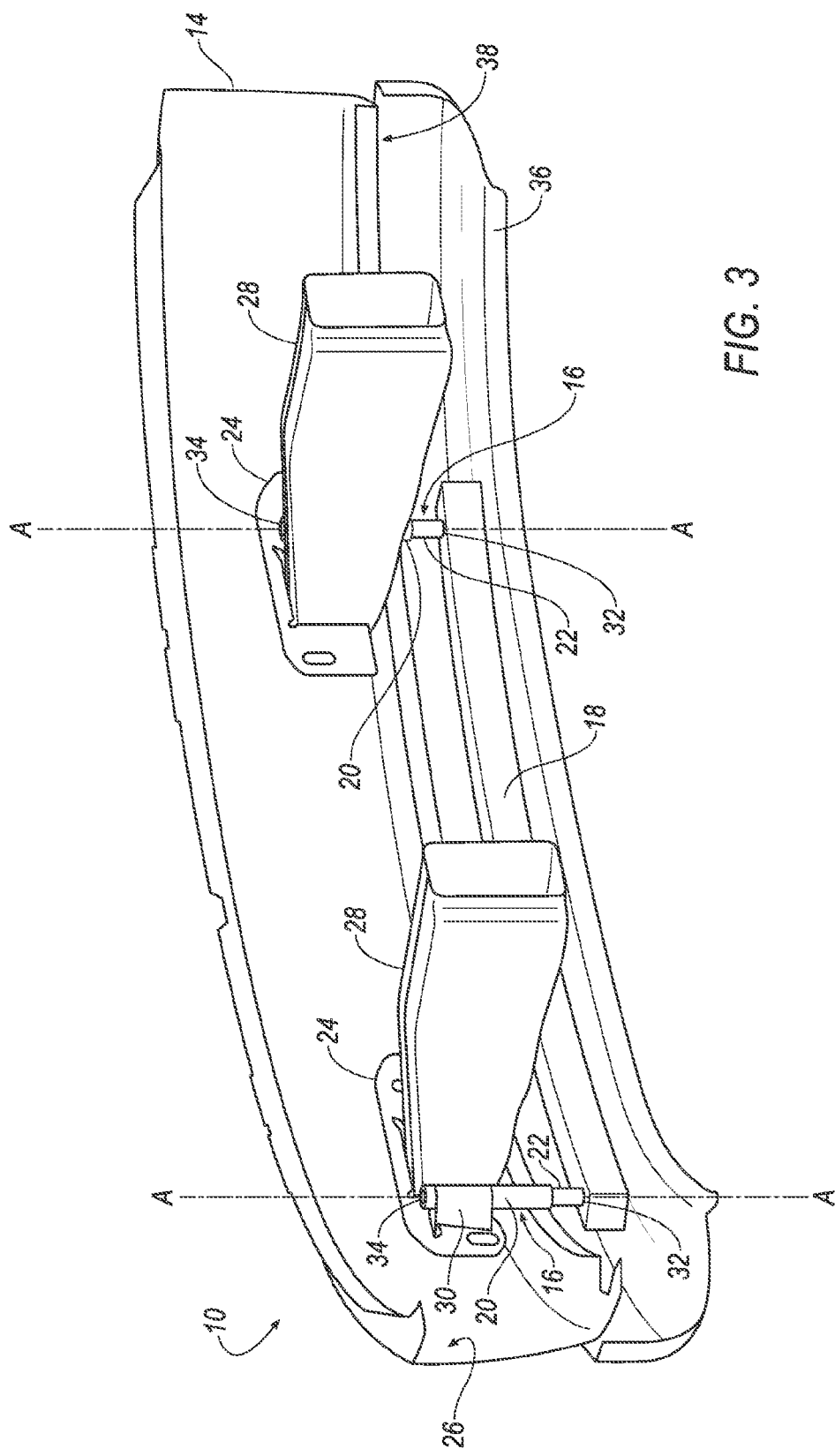
FIG. 3 is a perspective view of a rear side of the first embodiment of the bumper assembly showing the lower stiffener in the deployed position.
Figure 4:
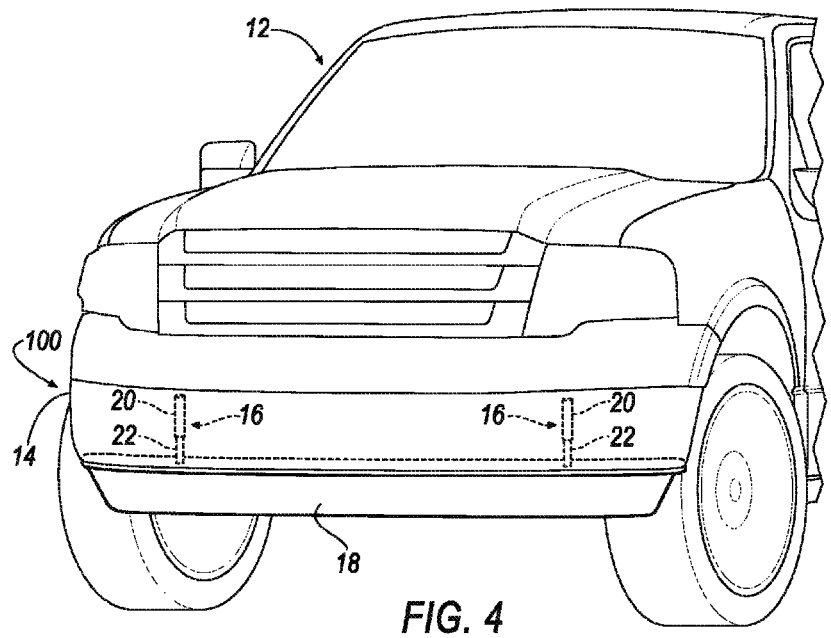
FIG. 4 is a perspective view of a portion of a vehicle including a second embodiment of a bumper assembly including a lower stiffener in a retracted position.
Figure 5:
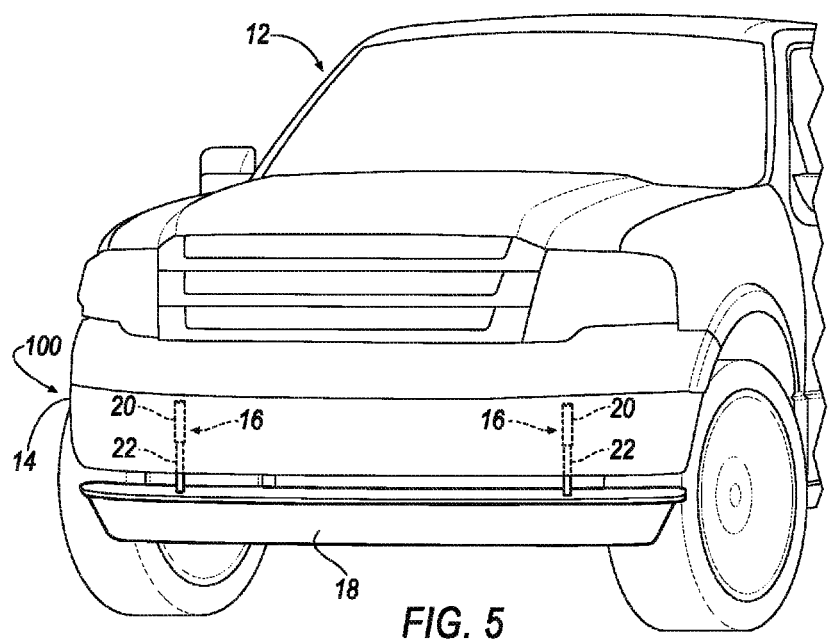
FIG. 5 is the perspective view of FIG. 4 with the lower stiffener in a deployed position.
Figure 6:
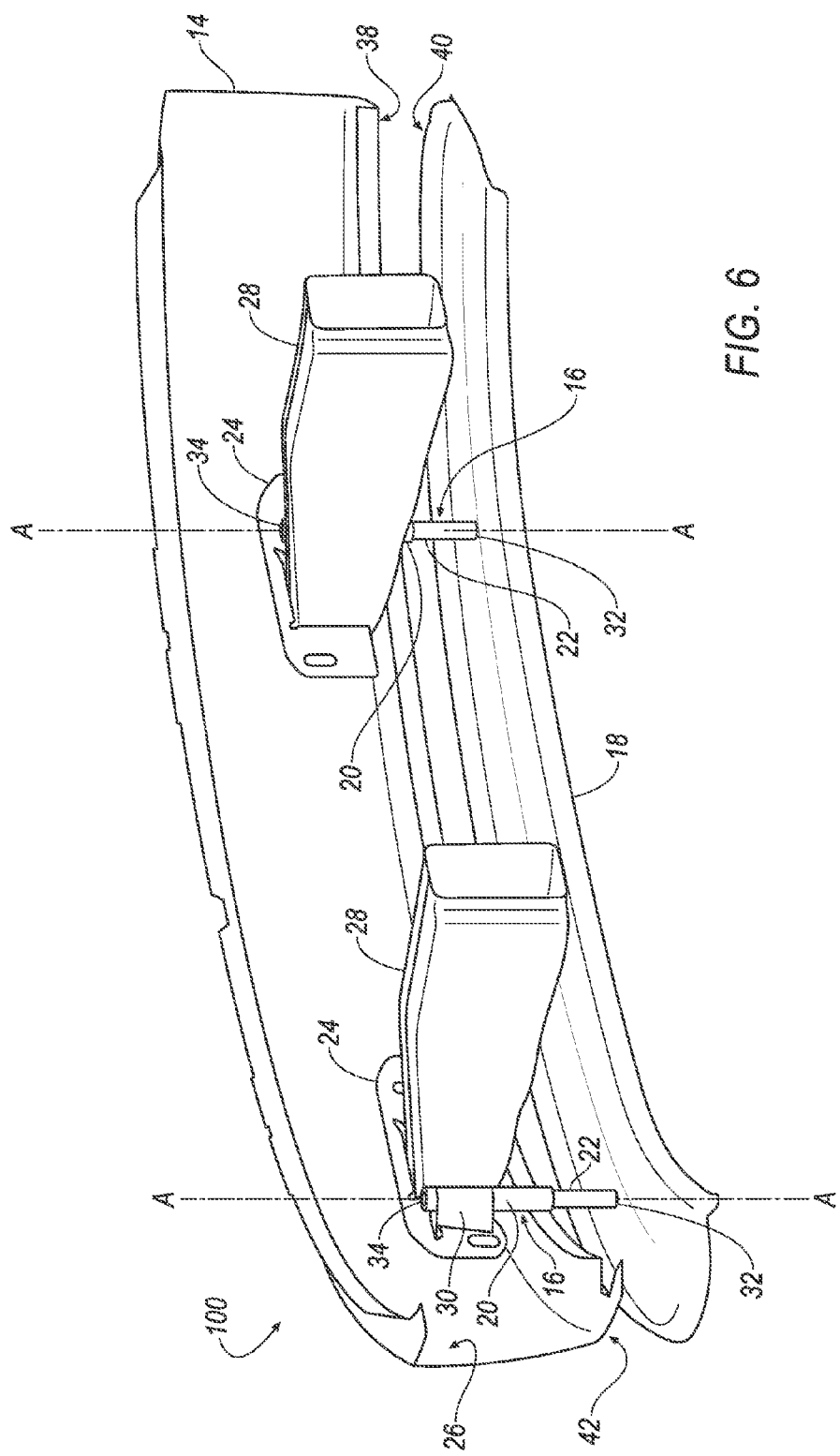
FIG. 6 is a perspective view of a rear side of the second embodiment of the bumper assembly showing the lower stiffener in the deployed position.
Figure 7:
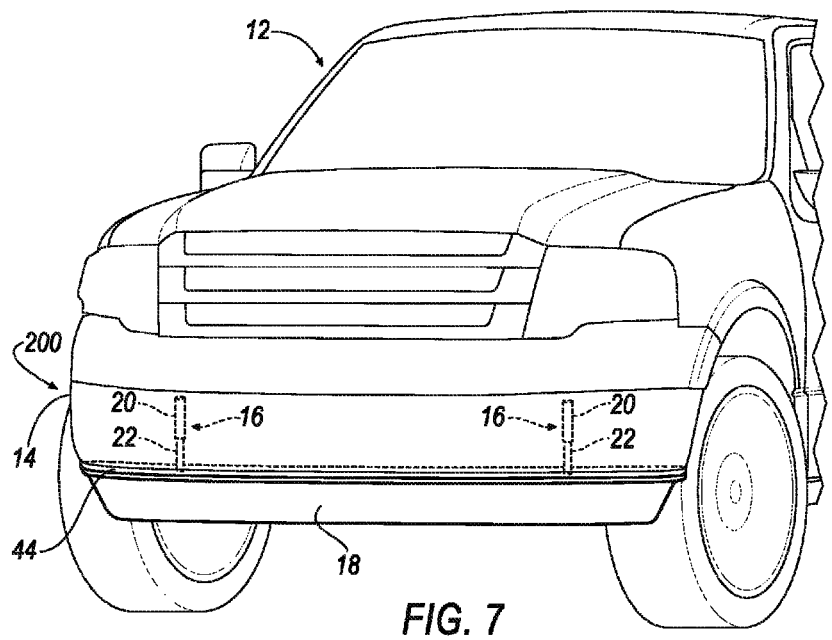
FIG. 7 is a perspective view of a portion of a vehicle including a third embodiment of a bumper assembly including a lower stiffener in a retracted position and a shield that is folded.

The lower stiffener 18 is moveable along the vertical axis A between a retracted position, shown in FIGS. 1, 4, and 7, and a deployed position shown in FIGS. 2-3, 5-6 and 8-9. By moving along the vertical axis A between the retracted position and the extended position, the mechanical complexity of the bumper assembly 10, 100, 200 may be reduced by avoiding complicated linkages and mechanisms. This reduction in complexity may decrease cost and increase reliability and durability.

As set forth further below, the lower stiffener 18 may be moved to the retracted position at low speeds, e.g., less than 25 KPH, and/or during off-road use to reduce the likelihood of damage to the lower stiffener 18. Specifically, at low speeds and/or in off-road use, it is generally more likely that the vehicle 12 is being operated in the vicinity of ground obstacles such as speed bumps, curbs, parking blocks, inclined driveways ramps, hills, rough roads, etc. Also, at these lower speeds and/or in off-road use, reinforcement of the bumper assembly 10, 100, 200 may not be useful for pedestrian leg impact requirements. In contrast, at other speeds, e.g., between 25-50 KPH, it may be beneficial for pedestrian leg impact considerations to reinforce the bumper assembly 10, 100, 200. As such, the lower stiffener 18 may be moved to the deployed positions at these speeds, e.g., 25-50 KPH. As set forth further below, the movement of the lower stiffener 18 between the retracted position and the deployed position at higher speeds, e.g., greater than 50 KPH, may be controlled based on aerodynamics of the vehicle 12, e.g., to improve fuel economy.

Figure 8:
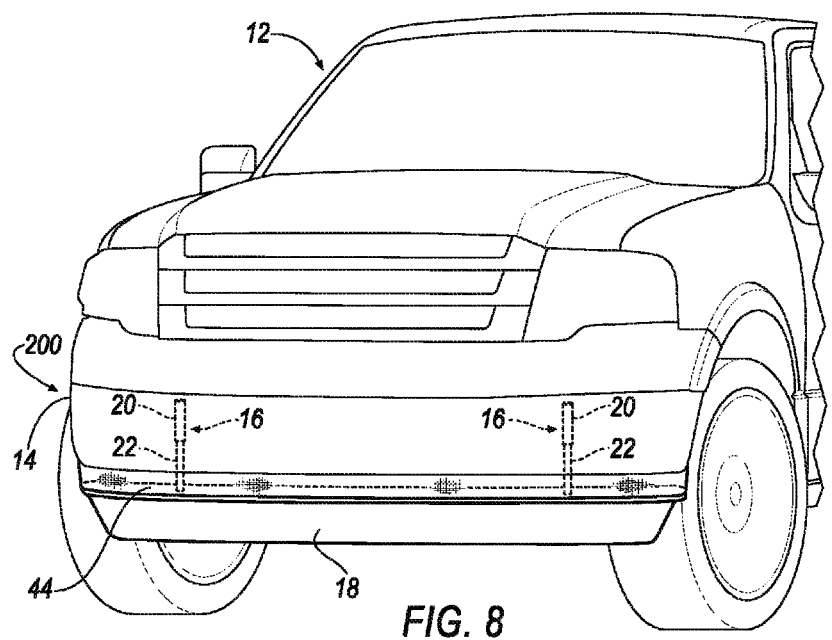
FIG. 8 is the perspective view of FIG. 7 with the lower stiffener in a deployed position and the shield unfolded.
Figure 9:
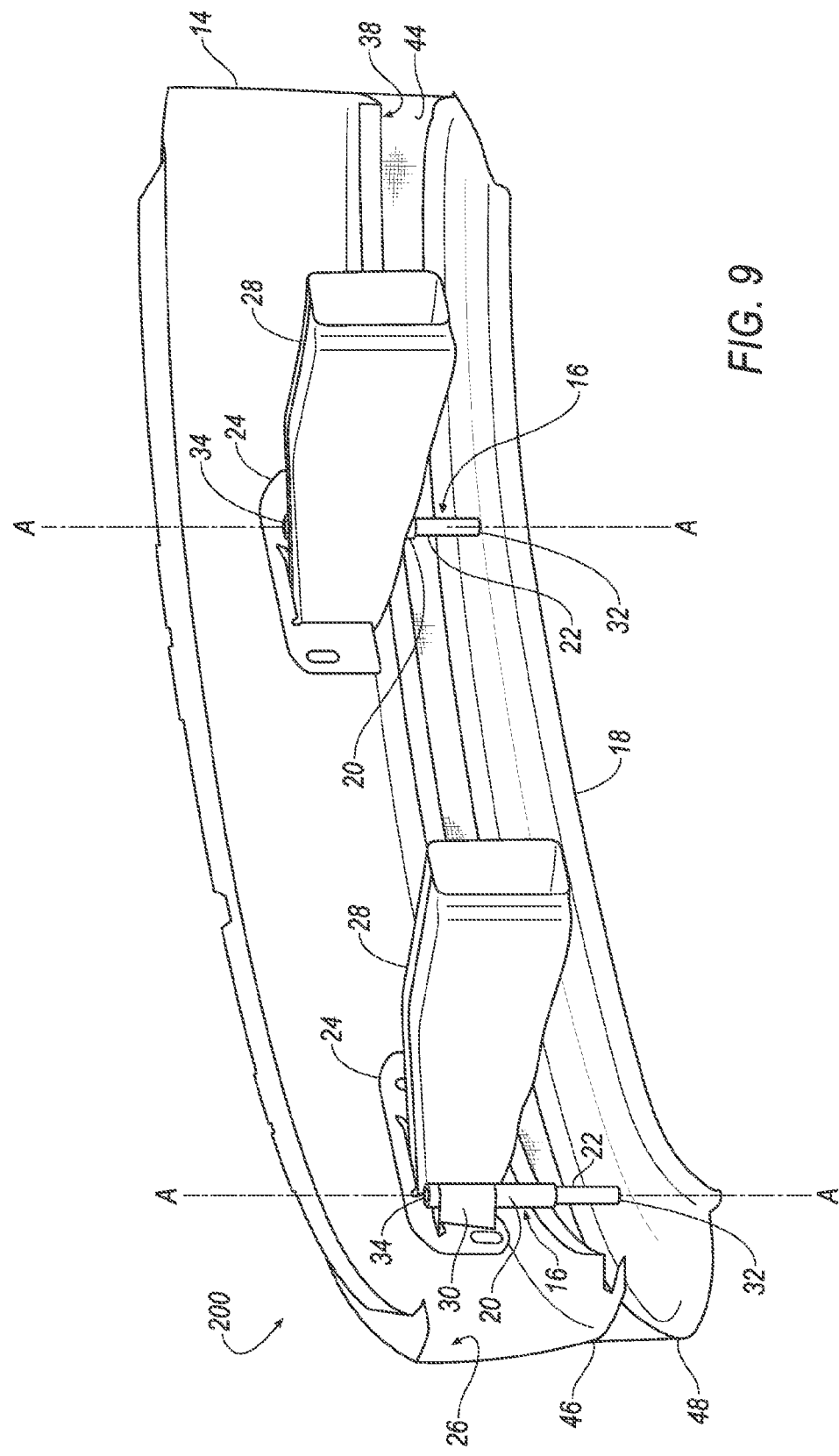
FIG. 9 is a perspective view of a rear side of the third embodiment of the bumper assembly the lower stiffener in the deployed position and the shield unfolded.

As set forth further below, a first embodiment of the bumper assembly 10 is shown in FIGS. 1-3, a second embodiment of the bumper assembly 100 is shown in FIGS. 4-6, and a third embodiment of the bumper assembly 200 is shown in FIGS. 7-9. Common numerals are used to identify common features in the various embodiments.

With reference to FIGS. 3, 6, and 9, the vehicle 12 may include a vehicle frame including front rails 28. The bumper beam 14 extends transversely to the front rails 28, e.g., in a cross-vehicle direction. The bumper assembly 10, 100, 200 may include mounting brackets 24 attached to a rear side 26 of the bumper beam 14 and the front rails 28 as shown in FIGS. 3, 6, and 9. The mounting brackets 24 may be fixed to the front rails 28 and the bumper beam 14 to mount the bumper beam 14 to the front rails 28 and/or to reinforce the bumper beam 14. The mounting brackets 24 may be fixed to the front rails 28 and the bumper beam 14 in any suitable fashion, e.g., welded and/or bolted to the rear side 26 and/or the front rails 28. The bumper beam 14, front rails 28, and the mounting brackets 24 may be formed of any suitable material such as metal, e.g., steel, aluminum, etc.

As set forth above, the actuator 16 is mounted to the bumper beam 14. Specifically, the actuator 16 may be mounted directly or indirectly to the bumper beam 14. For example, the actuator 16 may be indirectly mounted to the bumper beam 14 through intermediate components, e.g., a support bracket 30 set forth below. As another example, the actuator 16 may be indirectly mounted to the bumper beam 14 through one of the front rails 28, i.e., the actuator 16 may be mounted directly or indirectly to one of the front rails 28, which are mounted to the bumper beam 14. The bumper assembly 10, 100, 200 may include any suitable number of actuators 16 between the bumper beam 14 and the lower stiffener 18. For example, as shown in the figures, the bumper assembly 10, 100, 200 may include two actuators 16.

As set forth above, the bumper assembly 10, 100, 200 may include the support bracket 30. Specifically, the bumper assembly 10, 100, 200 may include more than one support bracket 30, e.g., one support bracket 30 for each actuator 16. As shown in FIGS. 3, 6, and 9, the support bracket 30 may attach the base 20 of the actuator 16 to the mounting brackets 24. The support bracket 30 may be fixed to the mounting brackets 24 and/or the bumper beam 14 in any suitable manner. For example, the support bracket 30 may be welded, adhered, screwed, and/or bolted to the mounting brackets 24 and/or the bumper beam 14. Alternatively, the bumper assembly 10, 100, 200 may include a flange (not shown) fixed to the rear side 26 of the bumper beam 14, e.g., the flange may be welded, screwed, adhered, and/or bolted to the rear side 26 of the bumper beam 14, and the support bracket 30 may be mounted to the flange in any suitable manner. The flange and support bracket 30 may be formed of any suitable material, e.g., metal such as steel, aluminum, etc. Alternatively, the support bracket 30 and/or the flange may be formed of an engineered plastic, e.g., acrylonitrile butadiene styrene (ABS), sheet molding compound (SMC) composites, etc.

The actuator 16 of the bumper assembly 10, 100, 200 may be a linear actuator that moves the lower stiffener 18 in a straight line. For example, the actuator 16 may be an electromagnetic linear solenoid that may be configured to be connected to a source of electrical current. In this case, the rod 22 of the actuator 16 is formed of a ferromagnetic material, e.g., steel. A coil (not shown) is disposed in the base 20 and surrounds the rod 22. Upon application of a current to the coil, a magnetic field is established through the coil and is advanced along the rod 22. The magnetic field produces a force on the rod 22 to guide the rod 22 along a linear trajectory. Alternatively, the linear actuator may be of any suitable type, for example, a stepper motor linear actuator, screw-type linear actuator, etc.

The lower stiffener 18 is operatively connected to the actuator 16 for linear movement between the retracted position, as shown in FIGS. 1, 4 and 7, to the deployed position, as shown in FIGS. 2-3, 5-6 and 8-9. The rod 22 of the actuator 16 may have a first end 32 attached to the lower stiffener 18, and a second end 34 moveably engaged with the base 20 of the actuator 16, as set forth above. The rod 22 is transverse, for example, perpendicular, to the lower stiffener 18, and both the rod 22 and the lower stiffener 18 move together linearly relative to the base 20 along the vertical axis A. Depending on the type of actuator, the rod 22 may be formed of any suitable material, e.g., ferromagnetic, aluminum, etc. The rod 22 may have any suitable length and solid cross-sectional shape, e.g., circular, triangle, solid, hollow, etc.

The rod 22 of the actuator 16 may be directly or indirectly connected to the lower stiffener 18 in any suitable fashion, for example, fasteners, brackets, rivets, welding, threaded screws, bolts and/or nuts, etc. The shape and material properties of the lower stiffener 18 is dependent on the embodiment of the bumper assembly 10, 100, 200 as described further below. In any case, the material strength of the lower stiffener 18 may be sufficient for proper pedestrian leg impact energy management.

The actuator 16 may be configured to allow the rod 22 to retract toward the retracted position when a force on the rod 22 along the vertical axis A exceeds a predetermined force. For example, the actuator 16 may allow the rod 22 to retract when the lower stiffener 18 in the deployed position comes into contact with objects underneath the vehicle 12, such as, for example, the ground during off-road use, freeway debris, etc. In other words, when subjected to excessive force along the vertical axis A, the actuator 16 may be configured to allow the rod 22 to move toward the base 20 and absorb energy from the contact while preventing damage to the actuator 16.

As set forth above, the first embodiment of the bumper assembly 10 is shown in FIGS. 1-3. The bumper assembly 10 may include a trim component 36, i.e., lower air deflector, fixed to a lower side 38 of the bumper beam 14. For example, the trim component 36 may fastened, riveted, clipped, etc., to the lower side 38 of the bumper beam 14. The trim component 36 may be formed of any suitable plastic material such as, for example, nylon, polystyrene, polyester, urethane, etc.

The trim component 36 in the first embodiment of the bumper assembly 10 is configured to extend away from the lower side 38 of the bumper beam 14 downward in a direction along the vertical axis A. When the lower stiffener 18 is in the deployed position, as shown in FIGS. 2-3, the trim component 36 extends downwardly beyond the lower stiffener 18 along the vertical axis A. Specifically, the lower stiffener 18 of the first embodiment of the bumper assembly 10 is adjacent to the rear side 26 of the bumper beam 14 and the lower stiffener 18 is disposed behind the bumper beam 14 and/or the trim component 36 when the lower stiffener 18 is in both the retracted position and the deployed position. In other words, the lower stiffener 18 is disposed between the bumper beam 14/trim component 36 and an engine compartment of the vehicle 12 when the lower stiffener 18 is in the retracted position and the deployed position. The bumper beam 14 and/or trim component 36 may conceal the lower stiffener 18 from view from an exterior of the vehicle 12 when the lower stiffener 18 is in the retracted position and the deployed position.

The lower stiffener 18 may be sufficiently rigid for pedestrian leg impact energy management. The lower stiffener 18 of the first embodiment of the bumper assembly 10 may be formed of any suitable material, e.g., metal such as steel, aluminum, etc. Alternatively, for example, the lower stiffener 18 of the first embodiment of the bumper assembly 10 may formed of a rigid engineered plastic, e.g., carbon fiber reinforced plastic (CFRP), sheet molding compound (SMC) composites, etc. The lower stiffener 18 of the first embodiment of the bumper assembly 10 may have any suitable length and solid cross-sectional shape, e.g., square, rectangular, etc. The lower stiffener 18 may be hollow with suitable wall thickness for proper rigidity.

As set forth above, the second embodiment of the bumper assembly 100 is shown in FIGS. 4-6. The lower stiffener 18 of the second embodiment of the bumper assembly 100 deflects air in the retracted position, as shown in FIG. 4, and provides pedestrian leg impact energy management in the deployed position, as shown in FIGS. 5-6. The lower stiffener 18 abuts the bumper beam 14 in the retracted position, and is spaced from the bumper beam 14 in the deployed position. An upper surface 40 of the lower stiffener 18 and a lower surface 42 of the bumper beam 14 may be configured, e.g., sized and shaped, to abut and/or nest when the lower stiffener 18 is in the retracted position.

The lower stiffener 18 of the second embodiment of the bumper assembly 100 may have a class-A surface finish, i.e., a surface specifically manufactured to have a high quality, finished aesthetic appearance free of blemishes. The lower stiffener 18, as best shown in FIG. 6, may have contours and/or ribs that stiffen the lower stiffener 18 and/or improve aerodynamics of the lower stiffener 18 in the deployed position.

The lower stiffener 18 of the second embodiment of the bumper assembly 100 may be formed of any suitable material, e.g., metal such as steel, aluminum, etc. Alternatively, for example, the lower stiffener 18 of the second embodiment of the bumper assembly 100 may formed of a rigid engineered plastic, e.g., carbon fiber reinforced plastic (CFRP), sheet molding compound (SMC) composites, etc. As yet another example, the lower stiffener 18 of the second embodiment of the bumper assembly 100 may be formed of metal or rigid engineered plastic, and overmolded with any suitable plastic material such as, for example, nylon, polystyrene, polypropylene, polyester, urethane, etc. In any case, the material strength of the lower stiffener 18 may be sufficient for proper pedestrian leg impact energy management.

As set forth above, the third embodiment of the bumper assembly 200 is shown in FIGS. 7-9. The bumper assembly 200 may include a shield 44 extending from the bumper beam 14 to the lower stiffener 18. Specifically, the shield 44 has a first shield end 46 fixed to the lower side 38 of the bumper beam 14, and a second shield end 48 fixed to the lower stiffener 18. For example, the first shield end 46 and second shield end 48 may be fastened, riveted, clipped, etc., to the lower side 38 of the bumper beam 14 and the lower stiffener 18, respectively. The shield 44 is folded, i.e., compressed, when the lower stiffener 18 is in the retracted position, as shown in FIG. 7. The shield 44 is unfolded, i.e., pulled taut, when the lower stiffener 18 is in the deployed position, as shown in FIGS. 8-9. The shield 44 may be formed of any suitable material. For example, the shield 44 may be formed of an elastomeric material.

The shield 44 and the lower stiffener 18 of the third embodiment of the bumper assembly 200 may have a class-A surface finish, i.e., a surface specifically manufactured to have a high quality, finished aesthetic appearance free of blemishes. The lower stiffener 18 of the third embodiment of the bumper assembly 200 deflects air in the retracted position. In the deployed position, the lower stiffener 18 and the shield 44 deflect air. The lower stiffener 18, as best shown in FIG. 9, may have contours and/or ribs that stiffen the lower stiffener 18 and/or improve aerodynamics of the lower stiffener 18 in the deployed position.

The lower stiffener 18 of the third embodiment of the bumper assembly 200 may be spaced from the bumper beam 14 in both the retracted position and in the deployed position. The lower stiffener 18 may be formed of any suitable material, e.g., metal such as steel, aluminum, etc. Alternatively, for example, the lower stiffener 18 may formed of a rigid engineered plastic, e.g., carbon fiber reinforced plastic (CFRP), sheet molding compound (SMC) composites, etc. As yet another example, the lower stiffener 18 may be formed of metal or rigid engineered plastic, and overmolded with any suitable plastic material such as, for example, nylon, polystyrene, polypropylene, polyester, urethane, etc. In any case, the material strength of the lower stiffener 18 may be sufficient for proper pedestrian leg impact energy management.

Some vehicles 12, e.g., light duty trucks, may be operable in an Off-Road mode in which certain vehicle systems (suspension and/or powertrain, for example) have settings adapted for operation on unpaved, rough surfaces and, usually, at lower speeds. Such an Off-Road mode may be selected manually by the vehicle operator (if such a switch option is provided for the operator) and/or may be triggered automatically based on certain detected parameters. When the vehicle 12 is operating in an Off-Road mode, it is expected that it will be traveling in an area in which pedestrians are not likely to be present, and it is assumed that the vehicle 12 will require the largest possible ground clearance to avoid striking obstacles. Therefore, in the Off-Road mode, the lower stiffener 18 may be retained in the retracted position regardless of the vehicle speed.

Figure 10:
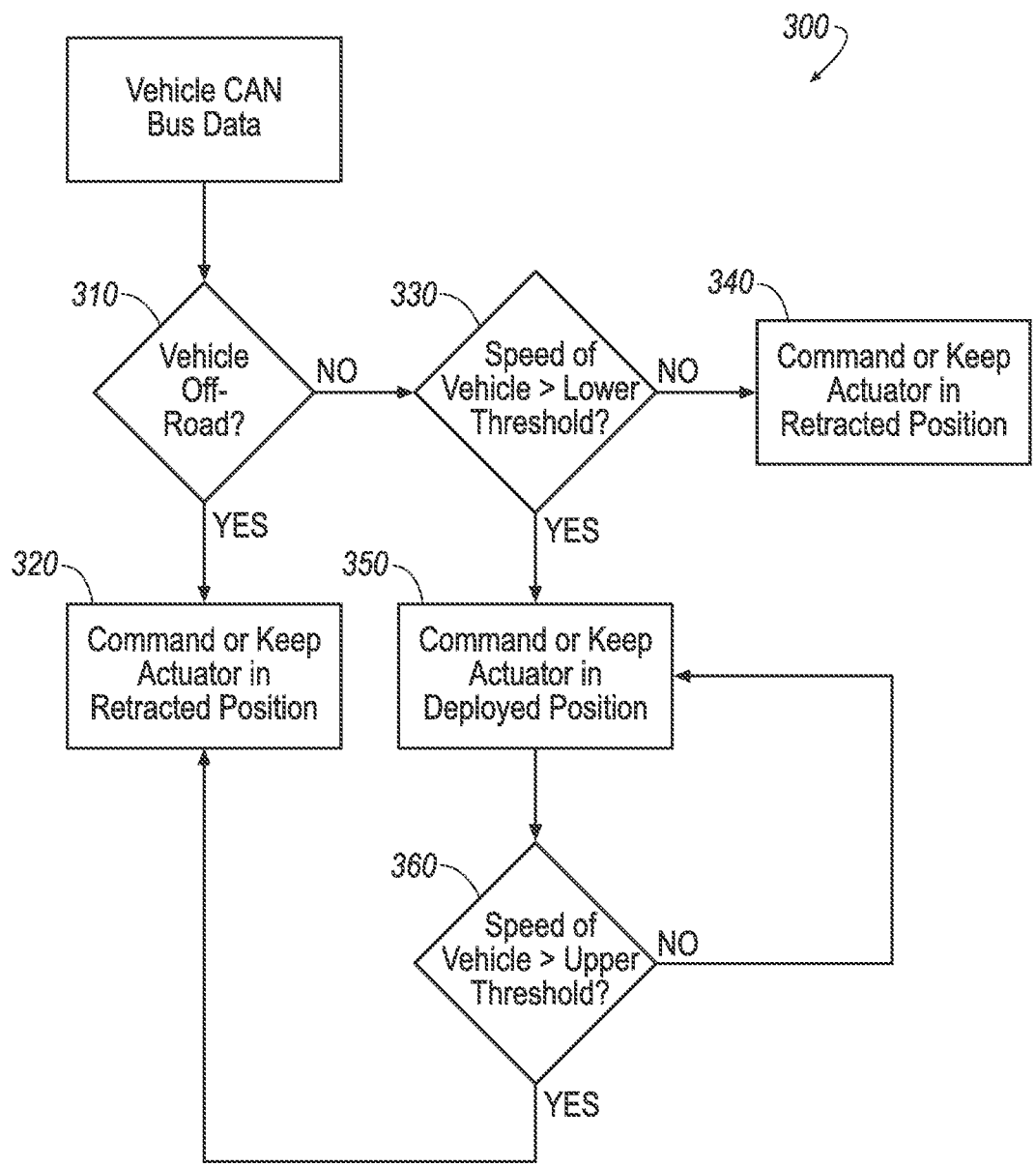
FIG. 10 is one embodiment of a flowchart of a speed-based deployment logic.

FIG. 10 illustrates an example of a speed-based deployment logic 300 for the first embodiment, second embodiment, and/or third embodiment of the bumper assembly 10, 100, 200. At block 310, if a vehicle control system (not shown) is in Off-Road mode, the lower stiffener 18 is maintained in the retracted position (block 320). If the Off-Road mode is not engaged, the logic progresses to block 330 where the vehicle speed is compared with a lower threshold speed, e.g., 25 kph. If the speed is below this lower threshold speed, the lower stiffener 18 is maintained in the retracted position, as shown in block 340. If the vehicle speed check at block 330 is found to exceed the lower threshold speed, a signal triggers the actuator 16 (block 350) to move the lower stiffener 18 to the deployed position. The lower stiffener 18 remains in the deployed state as long as the speed remains above the lower threshold speed. At block 360, the speed is compared with an upper threshold speed, e.g., 50 kph. If the vehicle 12 remains below the upper threshold speed, the lower stiffener 18 remains deployed. But if the speed exceeds the upper threshold speed, the logic advances to block 320, and the lower stiffener 18 is retracted to in order to reduce aerodynamic drag and to improve energy efficiency.

Figure 11:
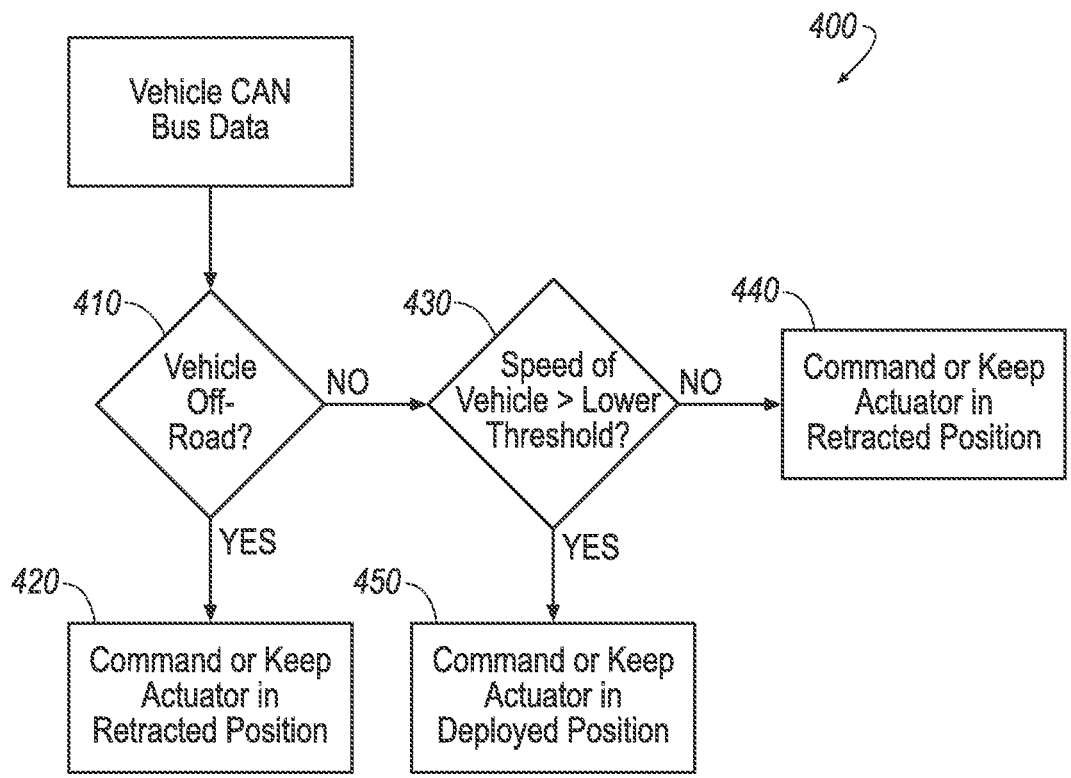
FIG. 11 is a flowchart of another embodiment of the speed-based deployment logic for the third embodiment of the bumper assembly.

FIG. 11 illustrates another example of a speed-based deployment logic 400 for the third embodiment of the bumper assembly 200. At block 410, if a vehicle control system (not shown) is in Off-Road mode, the lower stiffener 18 is maintained in the retracted position (block 420). If the Off-Road mode is not engaged, the logic progresses to block 430 where the vehicle speed is compared with a lower threshold speed, e.g., 25 kph. If the speed is below this lower threshold speed, the lower stiffener 18 is maintained in the retracted position, as shown in block 440. If the vehicle speed check at block 430 is found to exceed the lower threshold speed, a signal triggers the actuator 16 (block 450) to move the lower stiffener 18 to the deployed position. The lower stiffener 18 remains in the deployed state as long as the speed remains above the lower threshold speed in order to reduce aerodynamic drag and to improve energy efficiency.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A bumper assembly comprising:
a front rail;
a bumper beam extending transverse to the front rail and including a mounting bracket fixed to the front rail;
an actuator including a base and a rod moveably engaged with the base along a vertical axis;
a support bracket attaching the base of the actuator directly to the mounting bracket of the bumper beam; and
a lower stiffener fixed to the rod.

2. The bumper assembly as set forth in claim 1, wherein the lower stiffener is moveable between a retracted position and a deployed position, and further comprising a trim component fixed to the bumper beam and extending beyond the lower stiffener in a direction away from the bumper beam along the vertical axis in the retracted position and the deployed position.

3. The bumper assembly as set forth in claim 1, wherein the lower stiffener presents a class-A surface finish.

4. The bumper assembly as set forth in claim 1, wherein the lower stiffener is moveable between a retracted position and a deployed position, and abuts the bumper beam in the retracted position.

5. The bumper assembly as set forth in claim 4, wherein the lower stiffener is spaced from the bumper beam in the deployed position.

6. The bumper assembly as set forth in claim 1, further comprising a shield extending from the bumper beam to the lower stiffener.

7. The bumper assembly as set forth in claim 6, wherein the lower stiffener is moveable between a retracted position and a deployed position, and is spaced from the bumper beam in the retracted position and in the deployed position.

8. The bumper assembly as set forth in claim 1, wherein the actuator is configured to retract when a force on the rod along the vertical axis exceeds a predetermined force.

9. A bumper assembly comprising:
a front rail;
a bumper beam extending transverse to the front rail and including a mounting bracket fixed to the front rail;
an actuator including a base;
a support bracket attaching the base of the actuator directly to the mounting bracket of the bumper beam; and
a lower stiffener operatively connected to the actuator for linear movement between a retracted position and a deployed position.

10. The bumper assembly as set forth in claim 9, further comprising a trim component fixed to the bumper beam and extending beyond the lower stiffener in a direction away from the bumper beam in the retracted position and the deployed position.

11. The bumper assembly as set forth in claim 9, wherein the lower stiffener presents a class-A surface finish.

12. The bumper assembly as set forth in claim 9, wherein the actuator is configured to linearly retract when a force on the lower stiffener exceeds a predetermined force.

13. A bumper assembly comprising:
a front rail;
a bumper beam extending transverse to the front rail and including a mounting bracket fixed to the front rail;
an actuator including a base;
a support bracket attaching the base of the actuator directly to the mounting bracket of the bumper beam;
a lower stiffener fixed to the actuator and moveable from a retracted position to a deployed position; and
a shield extending from the bumper beam to the lower stiffener;
wherein the shield is folded in the retracted position.

14. The bumper assembly as set forth in claim 13, wherein the shield is unfolded in the deployed position.

15. The bumper assembly as set forth in claim 13, wherein the shield is formed of an elastomeric material.

16. The bumper assembly as set forth in claim 13, wherein the shield presents a class-A surface finish.

17. The bumper assembly as set forth in claim 1, wherein the bumper beam has a rear side facing the front rail, and the mounting bracket is attached to the rear side.

18. A bumper assembly comprising:
a front rail;
a bumper beam extending transverse to the front rail and including a mounting bracket fixed to the front rail;
an actuator including a base;
a support bracket attaching the base of the actuator directly to the mounting bracket of the bumper beam;
a lower stiffener fixed to the actuator and moveable from a retracted position to a deployed position; and
a shield extending from the bumper beam to the lower stiffener;
wherein the shield is formed of an elastomeric material.

19. The bumper assembly as set forth in claim 18, wherein the shield is folded in the retracted position and unfolded in the deployed position.

20. The bumper assembly as set forth in claim 18, wherein the shield presents a class-A surface finish.

* * * * *